United States Patent [19]
Shimada

[11] Patent Number: 5,877,832
[45] Date of Patent: Mar. 2, 1999

[54] ACTIVE MATRIX SUBSTRATE, FOR USE IN A LIQUID CRYSTAL DISPLAY AND METHOD FOR PRODUCING THE SAME

[75] Inventor: Yoshinori Shimada, Yamatokoriyama, Japan

[73] Assignee: Sharp Kabushiki Kaisha, Osaka, Japan

[21] Appl. No.: 815,702

[22] Filed: Mar. 12, 1997

[30] Foreign Application Priority Data

Mar. 15, 1996 [JP] Japan ................................ 8-059851
Jan. 14, 1997 [JP] Japan ................................ 9-005111

[51] Int. Cl.⁶ .................... G02F 1/1333; G02F 1/136; G02F 1/1343
[52] U.S. Cl. ........................ 349/138; 349/43; 349/143
[58] Field of Search ............................ 349/42, 43, 138, 349/113, 143

[56] References Cited

U.S. PATENT DOCUMENTS

| | | | |
|---|---|---|---|
| 4,833,519 | 5/1989 | Kawano et al. | 357/59 |
| 5,003,356 | 3/1991 | Wakai et al. | 357/4 |
| 5,056,895 | 10/1991 | Kahn | 359/87 |
| 5,256,564 | 10/1993 | Narita | 437/195 |
| 5,317,432 | 5/1994 | Ino | 349/42 |
| 5,327,001 | 7/1994 | Wakai et al. | 257/350 |
| 5,466,971 | 11/1995 | Higuchi | 257/751 |
| 5,500,750 | 3/1996 | Kanbe et al. | 349/42 |
| 5,585,951 | 12/1996 | Noda et al. | 349/122 |
| 5,592,318 | 1/1997 | Majima et al. | 349/122 |
| 5,641,974 | 6/1997 | den Boer et al. | 257/59 |

*Primary Examiner*—William L. Sikes
*Assistant Examiner*—Tarifur R. Chowdhury
*Attorney, Agent, or Firm*—Nixon & Vanderhye PC

[57] ABSTRACT

An active matrix substrate includes a switching device; a scanning line electrically connected to the switching device; a signal line electrically connected to the switching device and arranged so as to cross the scanning line; an interlayer insulation layer formed over the switching device, the scanning line and the signal line, the interlayer insulation layer having a contact hole; and a picture element electrode provided on the interlayer insulation layer and electrically connected to the switching device through the contact hole. The picture element electrode has a recessed portion in the contact hole, and a buried portion formed of an insulation material is provided in the recessed portion so that a top surface of the buried portion and a top surface of the picture element electrode are at an identical level.

20 Claims, 9 Drawing Sheets

FIG. 9B

ACTIVE MATRIX SUBSTRATE, FOR USE IN A LIQUID CRYSTAL DISPLAY AND METHOD FOR PRODUCING THE SAME

BACKGROUND OF THE INVENTION

1. Field of the Invention

The present invention relates to an active matrix substrate including switching devices such as thin film transistors (hereinafter, referred to as "TFTs") and a liquid crystal display device (hereinafter, referred to as an "LCD device") including the active matrix substrate.

2. Description of the Related Art

Figure 5:
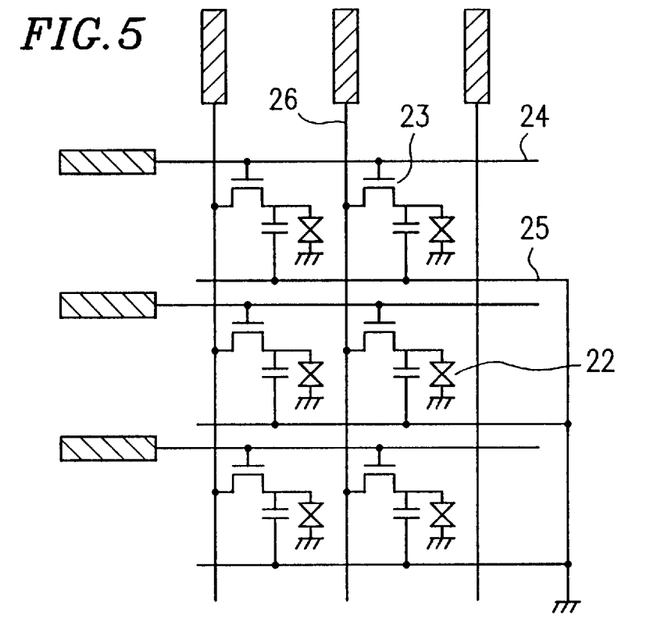
FIG. 5 shows an exemplary structure of an active matrix substrate including switching devices.

An LCD device includes an active matrix substrate and a counter substrate between which is interpose a liquid crystal material acting as a display medium therebetween. FIG. 5 shows an exemplary structure of an active matrix substrate including switching devices.

The active matrix substrate shown in FIG. 5 includes a plurality of TFTs 23 acting as switching devices arranged in a matrix and a plurality of picture element capacitors 22 also arranged in a matrix. A plurality of gate lines 24 acting as scanning lines for controlling the TFTs 23 are connected to gate electrodes of the respective TFTs 23. The TFTs 23 are each driven by a signal input to the respective gate lines 24. A plurality of source lines 26 acting as signal lines for supplying data signals to the TFTs 23 are connected to source electrodes of the respective TFTs 23. Video signals or other signals are input to the source lines 26. The gate lines 24 and the source lines 26 are arranged to cross each other. A drain electrode of each TFT 23 is connected to a picture element electrode and one of two terminals of the respective picture element capacitor 22. The other terminal of each picture element capacitor 22 is connected to a picture element line 25. The picture element line 25 is to be connected to a counter electrode in the counter substrate when the active matrix substrate is combined with the counter substrate to produce an LCD device.

Figure 6:
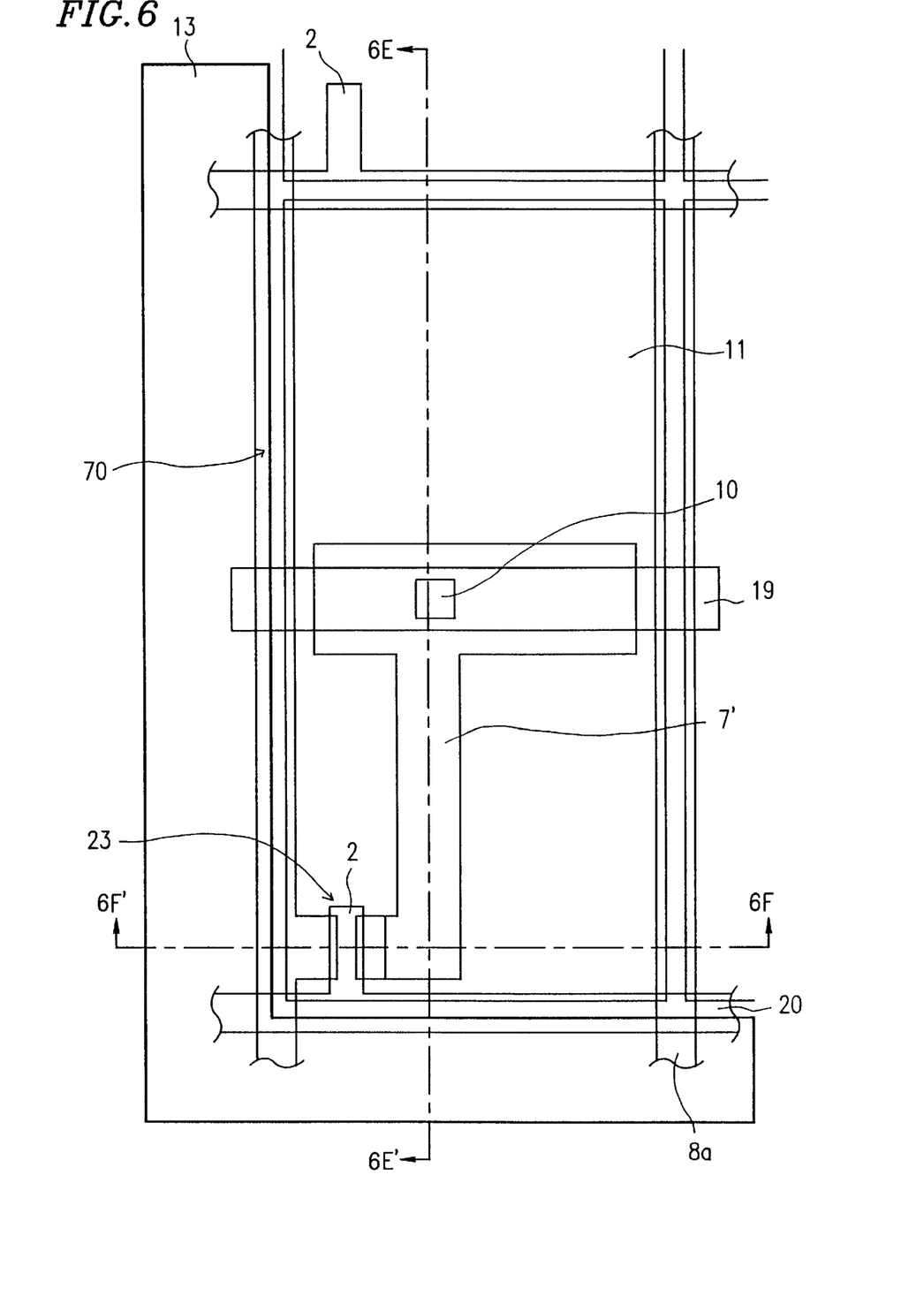
FIG. 6 is a partial plan view of a conventional LCD device including an active matrix substrate as shown in FIG. 5.
Figure 7A:
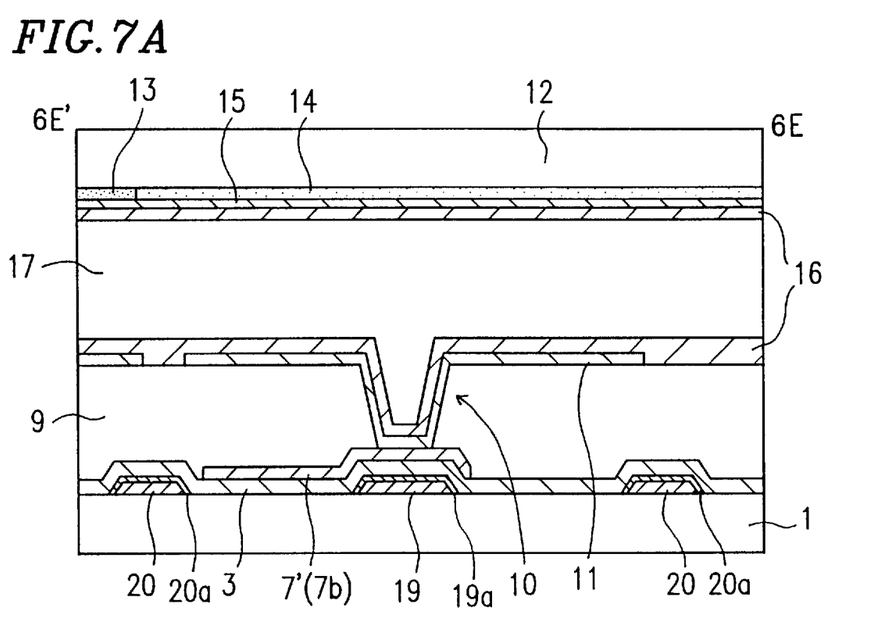
FIG. 7A is a cross sectional view of the conventional LCD device shown in FIG. 6 along line 6E–6E'.

FIG. 6 is a partial plan view of a conventional LCD device including such an active matrix substrate. FIG. 7A is a cross sectional view of the LCD device along line E–E' in FIG. 6, and FIG. 7B is a cross sectional view of the LCD device along line F–F' in FIG. 6.

As shown in FIG. 6, the active matrix substrate includes a plurality of gate lines 20 and a plurality of source lines 70 which cross each other. A picture element area is defined by the two adjacent gate lines 20 and two adjacent source lines 70. FIGS. 6, 7A and 7B each show one picture element area of the active matrix substrate.

Figure 7B:
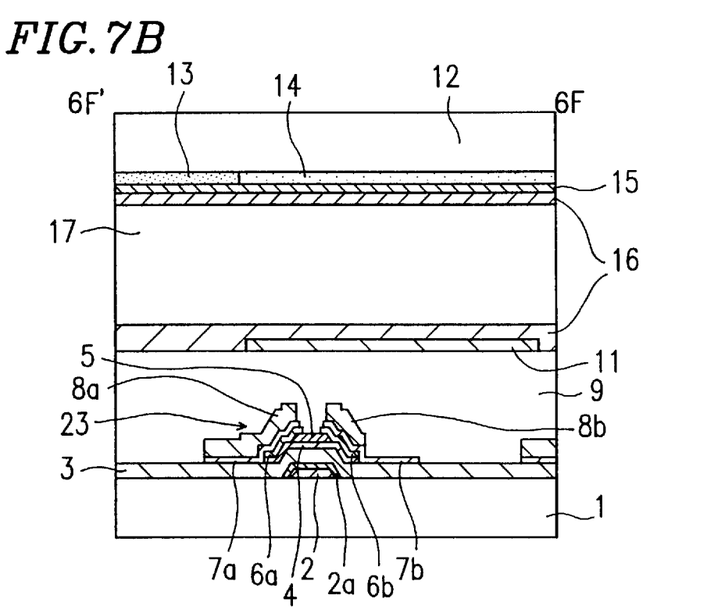
FIG. 7B is a cross sectional view of the conventional LCD device shown in FIG. 6 along line 6F–6F'.

As shown in FIG. 7B, the active matrix substrate includes a light-transmissive insulation plate 1, a gate electrode 2 provided on the plate 1, and a gate insulation layer 3 provided on the plate 1 so as to cover the gate electrode 2. A semiconductor layer 4 is provided on the gate insulation layer 3 above the gate electrode 2, and a channel protection layer 5 is provided on a central area of the semiconductor layer 4. A source electrode 6a and a drain electrode 6b both formed of $n^+$-Si are provided on the semiconductor layer 4 so as to cover the channel protection layer 5. The source electrode 6a and the drain electrode 6b are separated from each other on the channel protection layer 5. A source line 70 including an ITO (indium-tin-oxide) film 7a and a metal layer 8a provided on the ITO film 7a is provided on the gate insulation layer 3 so as to cover the source electrode 6a. A connecting electrode 7' formed of an ITO film 7b is provided on the drain electrode 6b, and a metal layer 8b is provided on the connecting electrode 7'. The connecting electrode 7' is extended on the gate insulation layer 3 for connecting the drain electrode 6b and a picture element electrode 11.

As shown in FIGS. 6 and 7A, the connecting electrode 7' is extended to cover a picture element storage capacitor signal line 19. An area where the connecting electrode 7', the gate insulation layer 3 and the picture element storage capacitor signal line 19 overlap acts as a storage capacitor.

An interlayer insulation layer 9 is provided on the gate insulation layer 3 so as to cover the gate line 20 (FIG. 6), the source line 70, and a TFT 23 including the gate electrode 2, the source electrode 6a and the drain electrode 6b. The picture element electrode 11 is provided on the interlayer insulation layer 9. The picture element electrode 11 is connected to the drain electrode 6b via the connecting electrode 7' at the bottom of a contact hole 10 formed so as to run through the interlayer insulation layer 9 in the thickness direction. In FIG. 7B, reference numeral 2a denotes an anodized film formed on the surface of the gate electrode 2. In FIG. 7A, reference numeral 19a denotes an anodized film formed on the surface of the picture element storage capacitor signal line 19.

In the active matrix substrate having the above-described structure, the interlayer insulation layer 9 is provided between the gate line 20/source line 70 and the picture element electrode 11. Accordingly, end parts of the picture element electrode 11 can be overlapped with the gate line 20 and the source line 70. Due to such a structure, the numerical aperture is improved, and an electric field generated by the gate line 20 and the source line 70 is shielded, thus preventing the defective orientation of liquid crystal molecules.

In the above-described structure, the picture element electrode 11 is connected to the drain electrode 6b through the contact hole 10 formed in the interlayer insulation layer 9, and thus the picture element electrode 11 has a stepped portion having a depth corresponding to the thickness of the interlayer insulation layer 9. The orientation of the liquid crystal molecules is disturbed over the stepped portion, possibly causing the light to be transmitted where the light should not be transmitted.

Conventionally, in order to solve this problem, areas corresponding to the contact holes are masked by, for example, using light-shielding materials for the metal electrodes, the gate lines, the source lines, the picture element storage capacitor signal lines or by a black matrix of a color filter. Accordingly, the opening of each picture element area is decreased, which prevents improvement of the numerical aperture.

In the cage of a reflection-type LCD device, the stepped portion of the picture element electrode changes the surface state of the picture element electrode and thus deteriorates a reflection characteristic. Conventionally, in order to solve this problem, areas corresponding to the contact holes are masked by a black matrix of a color filter. Accordingly, the opening of each picture element area is decreased, which prevents improvement of the numerical aperture.

SUMMARY OF THE INVENTION

According to one aspect of the invention, an active matrix substrate includes a switching device; a scanning line electrically connected to the switching device; a signal line electrically connected to the switching device and arranged so as to cross the scanning line; an interlayer insulation layer formed over the switching device, the scanning line and the signal line, the interlayer Insulation layer having a contact hole; and a picture element electrode provided on the interlayer insulation layer and electrically connected to the switching device through the contact hole. The picture element electrode has a recessed portion in the contact hole. A buried portion formed of an insulation material is provided in the recessed portion so that a top surface of the buried portion and a top surface of the picture element electrode are at an identical level.

In one embodiment of the invention, an active matrix substrate further includes an insulation layer provided on the picture element electrode. The insulation layer includes the buried portion, In one embodiment of the invention, the buried portion is formed of an organic thin film.

In one embodiment of the invention, the buried portion is formed of a film which is obtained as a result of applying a photosensitive organic thin film on the picture element electrode so as to cover the recessed portion and performing exposure to light and alkaline development of the photosensitive organic thin film.

In one embodiment of the invention, the insulation layer including the buried portion covers the picture element electrode, and a surface of the insulation layer is subjected to rubbing treatment so as to act as an alignment layer.

In one embodiment of the invention, the buried portion is transparent as a result of either one of optical decoloring and chemical decoloring.

In one embodiment of the invention, the buried portion is obtained as a result of applying an organic thin film to a plate having the picture element electrode thereon and performing anisotropic etching.

In one embodiment of the invention, an active matrix substrate further includes a plurality of convex areas provided on the picture element electrode and a reflection electrode formed over the plurality of convex areas. The plurality of convex areas are each formed of an insulation material. The picture element electrode is electrically connected to the reflection electrode between the plurality of convex areas, A surface of the reflection electrode has convex areas and concave areas.

In one embodiment of the invention, the plurality of convex areas and the buried portion are formed of an identical material.

In one embodiment of the invention, an active matrix substrate further includes a convex area on the buried portion.

According to another aspect of the invention, a liquid crystal display device includes an active matrix substrate having the above-described structure; a liquid crystal layer; and a counter substrate located to face the active matrix substrate with the liquid crystal layer interposed therebetween. By such a structure, light transmitted through the buried portion contributes to providing a display, According to still another aspect of the invention, a method for producing an active matrix substrate is provided. The active matrix substrate includes a switching device; a scanning line electrically connected to the switching device; a signal line electrically connected to the switching device and arranged so as to cross the scanning line; an interlayer insulation layer formed over the switching device, the scanning line and the signal line; a picture element electrode provided on the interlayer insulation layer; and a contact hole formed in the interlayer insulation layer. The picture element electrode has a recessed portion in the contact hole, and the switching device is electrically connected to the picture element electrode. The method includes the step of forming a buried portion in the recessed portion of the picture element electrode, thereby filling the recessed portion. The buried portion is formed of an insulation material.

In one embodiment of the invention, the method further includes the steps of forming a plurality of convex areas on the picture element electrode; and forming a reflection electrode so as to cover the plurality of convex areas, thereby forming convex areas and concave areas at a surface of the reflection electrode.

In one embodiment of the invention, the method further includes the step of applying a photosensitive resin to the picture element electrode and performing exposure to light and development of the photosensitive resin, thereby forming the buried portion and the plurality of convex areas simultaneously.

According to the present invention, the contact hole is filled with a buried portion, and a top surface of the buried portion is at the same level as that of the picture element electrode. Due to such a structure, the orientation of the liquid crystal molecules is not disturbed in an area corresponding to the contact hole. Thus, the light is not transmitted through an area where the light should not be transmitted. It is not necessary to mask the areas corresponding to the contact holes by using light-shielding materials for the metal electrodes, the gate lines, the source lines, the picture element storage capacitor signal lines, or by a black matrix of a color filter.

The buried portion can be formed of an organic thin film. For example, the buried portion is formed by applying a photosensitive organic thin film by spincoating and treating the photosensitive acrylic resin by exposure to light and alkaline development for patterning. Some types of photosensitive organic thin films are colored, in which case, the thin film can be made transparent by optical or chemical decoloring after being patterned. By performing anisotropic etching of an organic thin film, the thin film can be left only in the contact hole so that the top surface thereof is at the same level with the top surface of the picture element electrode.

The insulation layer including the buried portion can be used as an alignment layer by rubbing if an appropriate material is used.

When the contact hole is filled with a buried portion, convex areas can be formed on the picture element electrode in the same step, A reflection electrode formed thereon includes convex and concave areas, which results in efficient reflection of the incident light. Thus, the entire picture element area can be used efficiently, thereby improving the numerical aperture.

Thus, the invention described herein makes possible the advantages of providing an active matrix substrate for preventing defective orientation of liquid crystal molecules and undesirable light transmission in areas corresponding to contact holes while improving the numerical aperture, and an LCD device including such an active matrix substrate, These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Example 1

An LCD device 500 according to a first example of the present invention will be described with reference to FIGS. 1, 2A and 2B.

Figure 1:
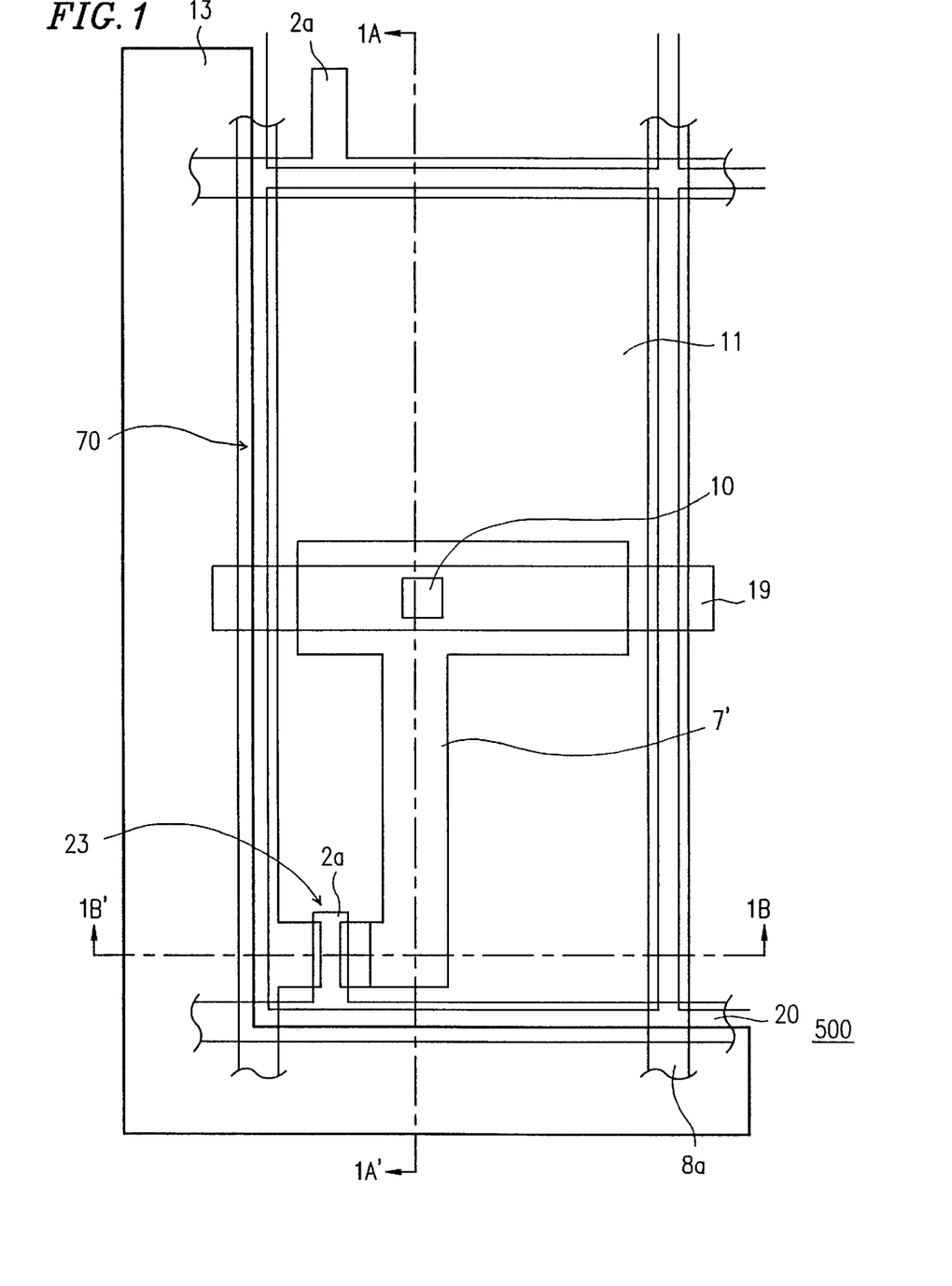
FIG. 1 is a partial plan view of an LCD device according to a first example of the present invention.

FIG. 1 is a partial plan view of the LCD device 500 according to the first example. FIG. 2A is a cross sectional view of the LCD device 500 along line 1A–1A' in FIG. 1, and FIG. 2B is a cross sectional view of the LCD device 500 along line 1B–1B' in FIG. 1.

Figure 2A:
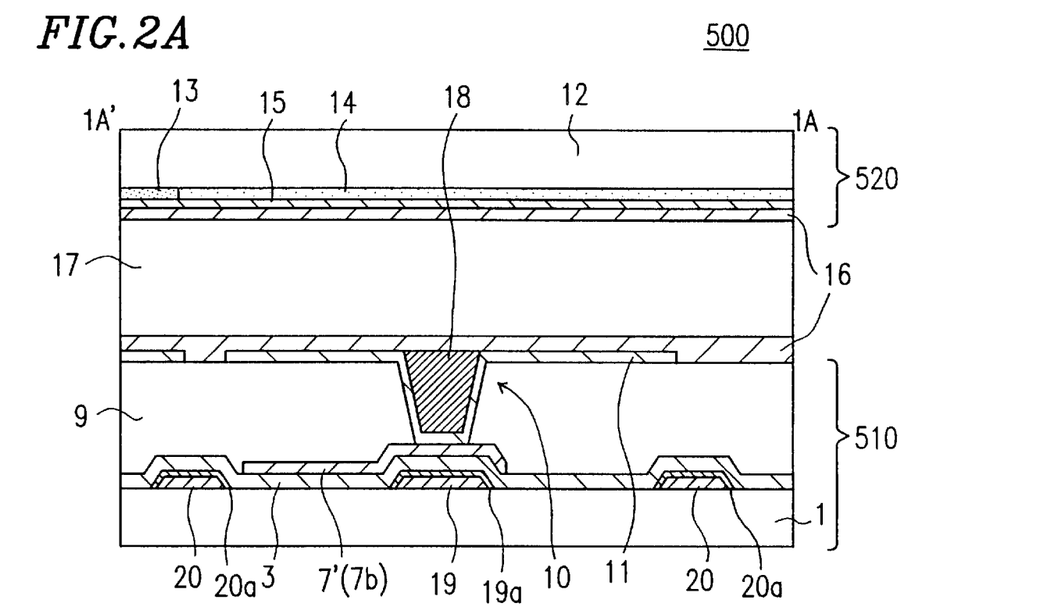
FIG. 2A is a cross sectional view of the LCD device shown in FIG. 1 along line 1A–1A'.
Figure 2B:
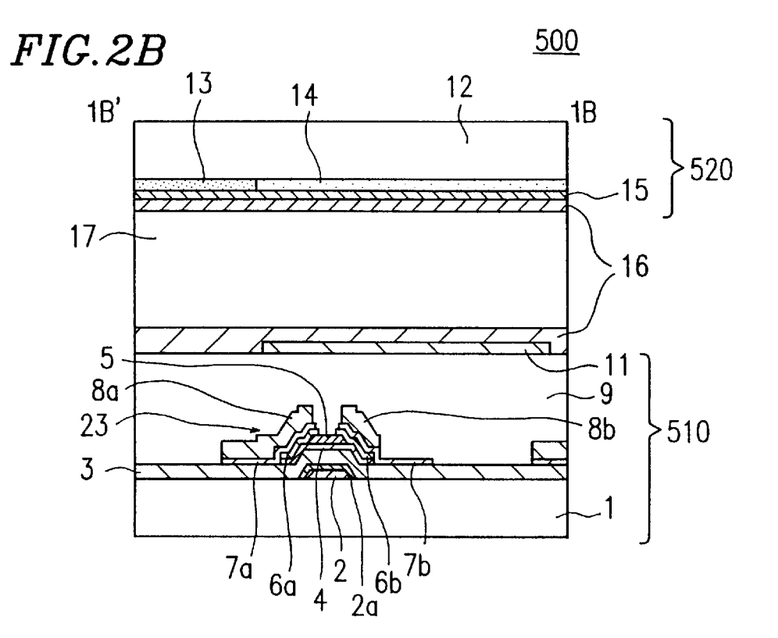
FIG. 2B is a cross sectional view of the LCD device shown in FIG. 1 along line 1B–1B'.

As shown in FIGS. 1, 2A and 2B, an active matrix substrate 510 of the LCD device 500 includes an insulation plate 1, a gate line 20, a gate electrode 2 connected to the gate line 20, and a picture element storage capacitor signal line 19. On the surfaces of the gate line 20, the gate electrode 2, and the picture element storage capacitor signal line 19, anodized films 20a, 2a and 19a are formed.

A semiconductor layer 4 is provided on the gate insulation layer 3 so as to overlap the gate electrode 2, and a channel protection layer 5 is provided on 4 central area of the semiconductor layer 4. A source electrode 6a and a drain electrode 6b both formed of n$^+$—Si are provided on the part of the semiconductor layer 4 and the parts of the channel protection layer 5. The source electrode 6a and the drain electrode 6b are separated from each other on the channel protection layer 5. The gate electrode 2, the source electrode 6a and the drain electrode 6b are included in a TFT 23.

A source line 70 including an ITO film 7a and a metal layer 8a provided on the ITO film 7a is provided on the gate insulation layer 3 so as to cover the source electrode 6a. The source line 70 is provided in a direction crossing the gate line 20.

A connecting electrode 7' formed of an ITO film 7b is provided on the drain electrode 6b, and a metal layer 8b is provided on the connecting electrode 7b. The connecting electrode 7' is extended on the gate insulation layer 3 for electrically connecting the drain electrode 6b and a picture element electrode 11. As shown in FIGS. 1 and 2A, the connecting electrode 7' is extended to cover the picture element storage capacitor signal line 19. An area where the connecting electrode 7', the gate insulation layer 3 and the picture element storage capacitor signal line 19 overlap acts as a storage capacitor.

An interlayer insulation layer 9 is provided on the gate insulation layer 3 so as to cover the gate line 20, the source line 70 and the TFT 23. The picture element electrode 11 is provided on the interlayer insulation layer 9. The picture element electrode 11 is electrically connected to the drain electrode 6b via the connecting electrode 7' at the bottom of a contact hole 10 formed so as to run through the interlayer insulation layer 9 in the thickness direction.

A shown in FIG. 2A, the contact hole 10 is filled with a buried portion 18 formed of an insulation material. A top surface of the picture element electrode 11 and a top surface of the buried portion 18 are at the same level. An alignment layer 16 is provided on the picture element electrode 11 and the buried portion 18.

A counter substrate 520 is located to face the active matrix substrate 510 with a liquid crystal layer 17 interposed therebetween. The counter substrate 520 includes a light-transmissive insulation plate 12, and a light-shielding layer 13 (black matrix) having an opening and a light shielding portion, a color filter 14, a counter electrode 15 and another alignment layer 16 sequentially provided on the light-transmissive insulation plate 12.

The LCD device 500 having such a structure is preferably formed in the following manner. First, a production method of the active matrix substrate 510 will be described.

The gate electrode 2, the gate line 20, the picture element storage capacitor signal line 19, the gate insulation layer 3, the semiconductor layer 4, the channel protection layer 5, and an n$^+$—Si layer which will be formed into the source electrode 6a and the drain electrode 6b are sequentially formed on the insulation plate 1 in an appropriate manner.

Next, the ITO films 7a and 7b, which are transparent and conductive, and the metal layers 8a and 8b are sputtered and patterned to form the source line 70 and the connecting electrode 7'. In this example, the source line 70 includes two layers, i.e., the ITO film 7a and the metal layer 8a. The source line 70 may include only the metal layer 8a. The two-layer structure is advantageous in that, even if the metal layer 8a is partially defective, the electric connection is still conducted by the ITO layer 7a, which reduces the possibility of line disconnection. Since the source line 70 and the connecting electrode 7' can be formed simultaneously, the production process of the ective matrix substrate 510 is simplified.

Then, the interlayer insulation layer 9 is formed of a photosensitive acrylic resin to a thickness of 3 $\mu$pm. The interlayer insulation layer 9 is exposed and treated by alkaline development, thereby forming the contact hole 10 which runs through the interlayer insulation layer 9.

On the interlayer insulation layer 9, the picture element electrode 11 is formed by sputtering and patterning. The picture element electrode 11 is formed of a transparent and conductive material such as ITO. The picture element electrode 11 is electrically connected to the connecting electrode 7' at the bottom of the contact hole 10. Thus, the picture element electrode 11 is connected to the source line 70 via the connecting electrode 7', the drain electrode 6b and the source electrode 6a.

Then, a photosensitive acrylic resin is formed to a thickness of 1500 nm by spin-coating. The resultant acrylic resin layer is exposed to light and treated by alkaline development, so as to leave the acrylic resin only in a picture element area. Then, a surface of the layers formed so far is exposed to light (light source: g, h, or i line; 300 mJ), thereby decoloring the acrylic resin to make it transparent. Lines g, h and i are lines of a line spectrum of light having a prescribed wavelength which is emitted from a mercury lamp for exposure. It is preferable to use the i line, which has the highest energy of the three. A "picture element area" refers to an area where the picture element electrode 11 overlaps the counter electrode 15.

Then, the acrylic resin is etched back using anisotropic etching in an oxygen plasma atmosphere, thereby forming the buried portion 18 which is filled only in the contact hole 10, so that the top surface of the picture element electrode 11 and the top surface of the buried portion 18 are at the same level.

Next, a production method of the counter substrate 520 will be described.

A metal layer is formed on the light-transmissive insulation plate 12 by sputtering and pattering, thereby forming the light-shielding layer 13. A photosensitive color resist is applied to the insulation plate 12 and treated by exposure to light and development, thereby forming the color filter 14 having red, green and blue areas. The counter electrode 15 is formed on the light-shielding layer 13 of ITO by sputtering.

The alignment layers 16 are formed both on the active matrix substrate 510 and the counter substrate 520.

The active matrix substrate 510 and the counter substrate 520 with the alignment layers 16 are assembled together, and a liquid crystal material is injected into the space between the two substrates. Thus, the liquid crystal layer 17 is formed.

In the LCD device 500 according to the first example, the interlayer insulation layer 9 is provided on the switching device (TFT 23), the gate line 20 and the source line 70, and the picture element electrode 11 is provided on the interlayer insulation layer 9. The picture element electrode 11 is connected to the drain electrode 6b of the TFT 23 through the contact hole 10 formed to run through the interlayer insulation layer 9. Due to such a structure, the picture element electrode 11 can overlap the lines. Thus, the numerical aperture is improved, and the defective orientation of the liquid crystal molecules is prevented.

Moreover, the buried portion 18 is formed to fill the contact hole 10 so that the top surface of the picture element electrode 11 and the top surface of the buried portion 18 are at the same level. Due to such a structure, the interlayer insulation layer 9 is not stepped due to the contact hole 10. Accordingly, the orientation of the liquid crystal molecules is not disturbed at an area corresponding to the contact hole 10. It is not necessary to mask the areas corresponding to the contact holes by using light-shielding materials for the metal electrodes, the gate lines 20, the source lines 70, the picture element storage capacitor signal lines 19 or by a black matrix of a color filter in order to prevent the light to be transmitted in an area where the light should not be transmitted. A transparent conductive material can be used for the connecting electrode 7' for connecting the drain electrode 6b of the TFT 23 and the picture element electrode 11. A transparent conductive material can be. used also for the picture element storage capacitor signal lines 19. By using a transparent conductive material for these elements, the numerical aperture is further improved.

As described above, the buried portion 18 is formed by applying a photosensitive acrylic resin by spin-coating and treating the photosensitive acrylic resin by exposure to light and alkaline development for patterning. By such a method, an organic thin film can be formed efficiently. After being patterned, the resin can be made transparent by optical or chemical decoloring. Furthermore, since the resultant organic thin film is etched back by anisotropic etching, the thin film can be left only in the contact hole 10 in a highly controllable manner so that the top surface thereof is at the same level with the top surface of the picture element electrode 11. Using an organic thin film for the buried portion 18 is advantageous In the above-described points. In lieu of acrylic resin, which is photosensitive, other types of organic thin films can be used. For example, polyamide, polyarylate, polyetherimide, epoxy can be used.

Example 2

An LCD device 600 according to a second example of the present invention will be described with reference to FIGS. 3, 4A and 4B.

Figure 3:
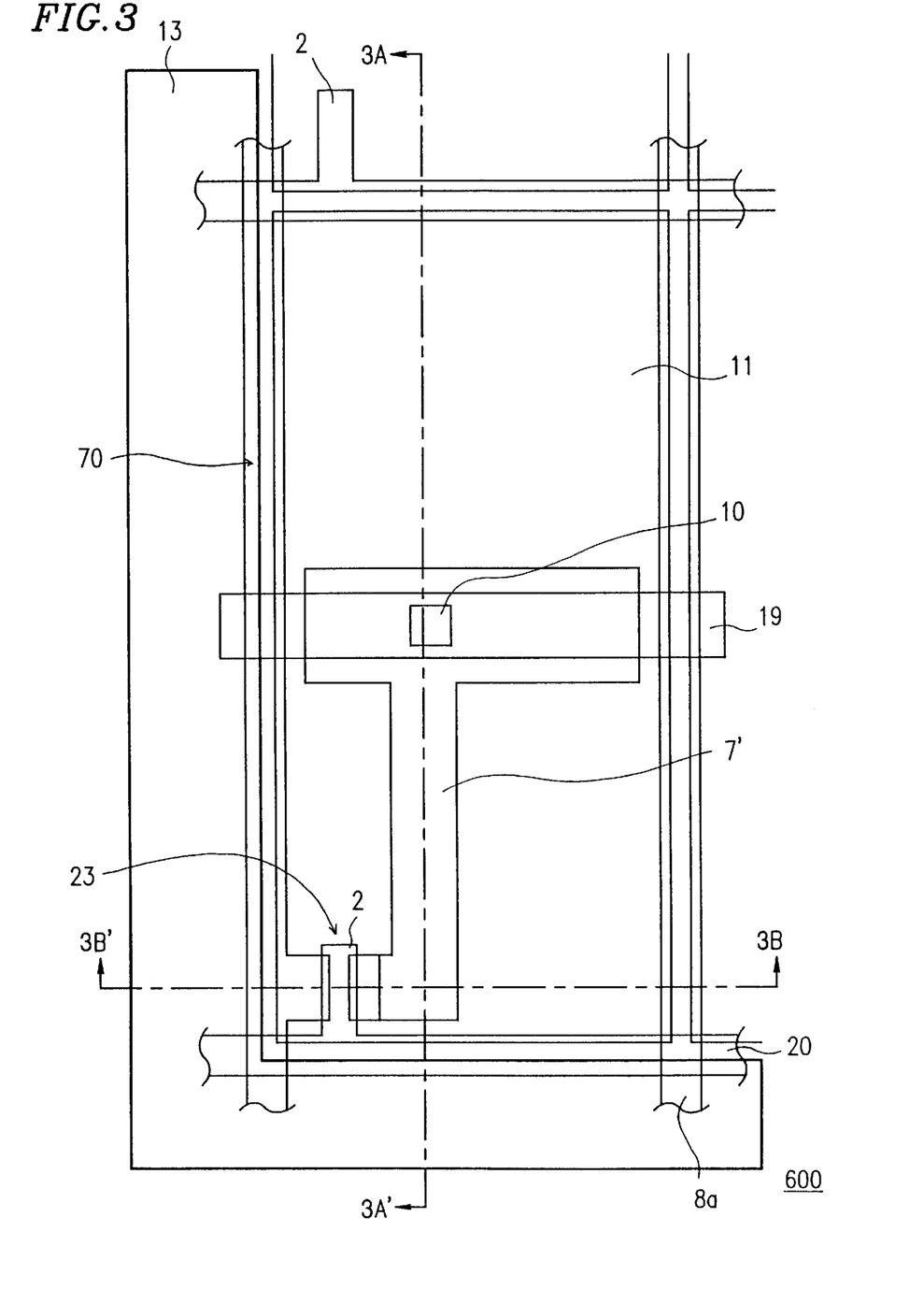
FIG. 3 is a partial plan view of an LCD device according to a second example of the present invention.
Figure 4A:
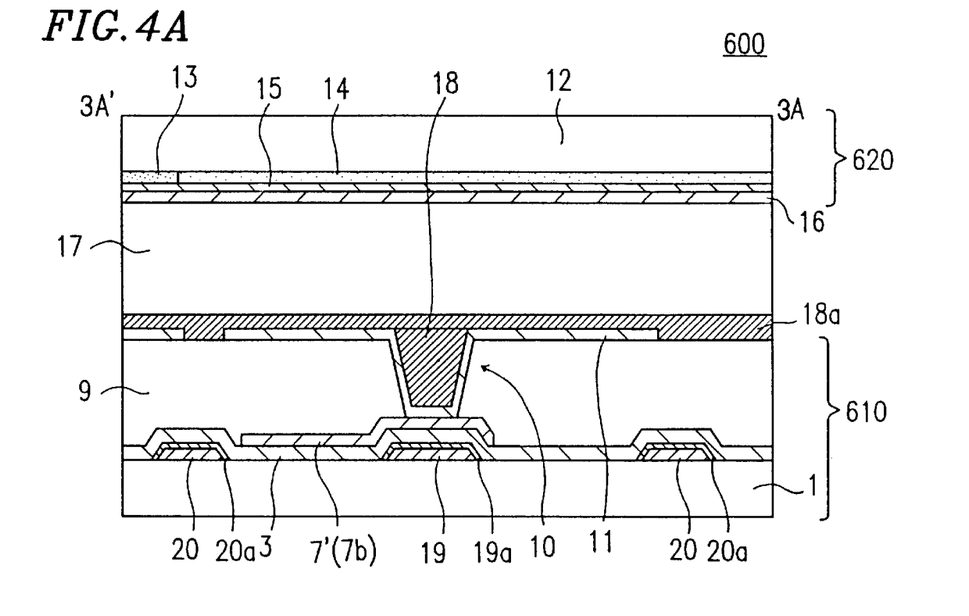
FIG. 4A is a cross sectional view of the LCD device shown in FIG. 3 along line 1A–1A'.
Figure 4B:
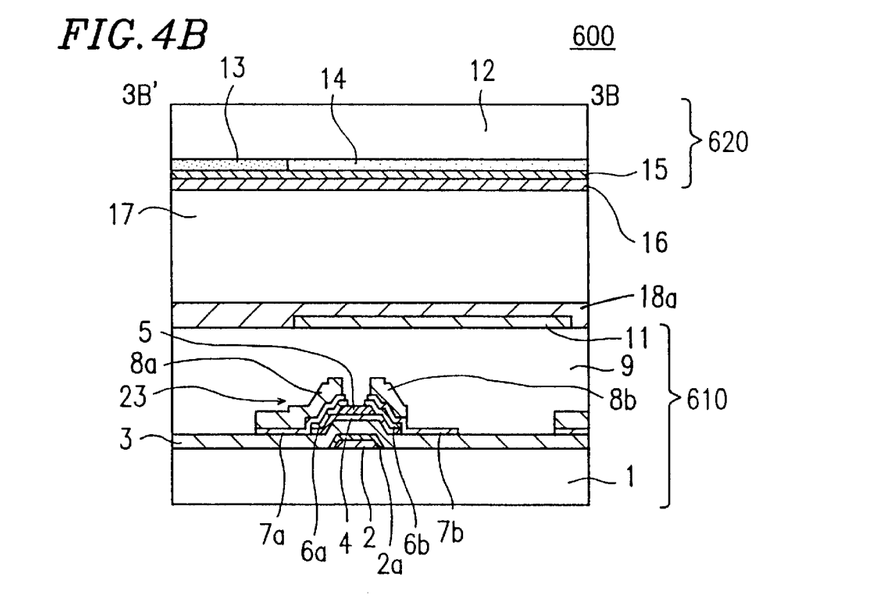
FIG. 4B is a cross sectional view of the LCD device shown in FIG. 3 along line 1B–1B'.

FIG. 3 is a partial plan view of the LCD device 600 according to the second example. FIG. 4A is a cross sectional view of the LCD device 600 along line 1A–1A' in FIG. 3, and FIG. 4B is a cross sectional view of the LCD device 600 along line 3B–3B' in FIG. 3.

The LCD device 600 is different in the following points from the LCD device 500 according to the first example. An insulation layer 18a formed of a polyimide resin is provided on the interlayer insulation layer 9 so as to cover the picture element electrode 11. The insulation layer 18a includes a buried portion 18 filling the contact hole 10. A surface of the insulation layer 18a in contact with a liquid crystal layer 17 is rubbed, and thus the insulation layer 18a acts as an alignment layer.

The LCD device 500 having such a structure is preferably formed in the following manner. First, a production method of the active matrix substrate 610 will be described.

The gate electrode 2, the gate signal line 20, the picture element storage capacitor signal line 19, the gate insulation layer 3, the semiconductor layer 4, the channel protection layer 5, and an $n^+$—Si layer which will be formed into the source electrode 6a and the drain electrode 6b are sequentially formed on the insulation plate 1 in an appropriate manner.

Next, the ITO films 7a and 7b, which are transparent and conductive, and the metal layers 8a and 8b are formed by sputtering and patterned to form the source line 70 and the connecting electrode 7'.

Then, the interlayer insulation layer 9 is formed of a photosensitive acrylic resin to a thickness of 3 $\mu$m. The interlayer insulation layer 9 is exposed and treated by alkaline development, thereby forming the contact hole 10 which runs through the interlayer insulation layer 9.

On the interlayer insulation layer 9, the picture element electrode 11 is formed by sputtering and patterning. The picture element electrode 11 is formed of a transparent and conductive material such as ITO. The picture element electrode 11 is electrically connected to the connecting electrode 7' at the bottom of the contact hole 10. Thus, the picture element electrode 11 is connected to the source line 70 via the connecting electrode 7'. the drain electrode 6b and the source electrode 6a. The above-described steps are performed in the same manner as in the first example, Then, a photosensitive polyimide resin is formed to a thickness of, for example, 1500 nm by spin-coating. The resultant polyimide resin layer is exposed to light and treated by alkaline development, so as to leave the polyimide resin only in the picture element area. Then, a surface of the layers formed so far is exposed to light (light source: g, h, or i line; 300 mJ), thereby decoloring the polyimide resin to make it transparent. Lines g, h and i are lines of a line spectrum of light having a prescribed wavelength which is emitted by a mercury lamp for exposure, It is preferable to use the i line, which has the highest energy of the three.

Then, the polyimide resin is etched back using anisotropic etching in an oxygen plasma atmosphere, thereby leaving the polyimide resin so as to fill the contact hole 10 (the buried portion 18) and also so as to form the interlayer insulation layer 18a covering the picture element electrode 11 to a thickness of about 50 to 100 nm. The top surface of the insulation layer 18a is flattened.

A counter substrate 620 is produced in the same manner as in the first example.

The top surface of the insulation layer 18a is rubbed so that the insulation layer 18a acts as an alignment layer. The alignment layer 16 is formed on the counter electrode 620 by printing a polyimide resin, and the alignment layer 16 is rubbed. The active matrix substrate 610 and the counter substrate 620 are assembled together, and a liquid crystal material is injected into the space between the two substrates. Thus, the liquid crystal layer 17 is formed. The LCD device 600 is produced in this manner.

In the LCD device 600 according to the second example, the insulation layer 18a also acts as an alignment layer. Accordingly, the step of printing a polyimide resin to the active matrix substrate can be eliminated.

Example 3

An LCD device 700 according to a third example of the present invention will be described with reference to FIGS. 8, 9A and 9B.

Figure 8:
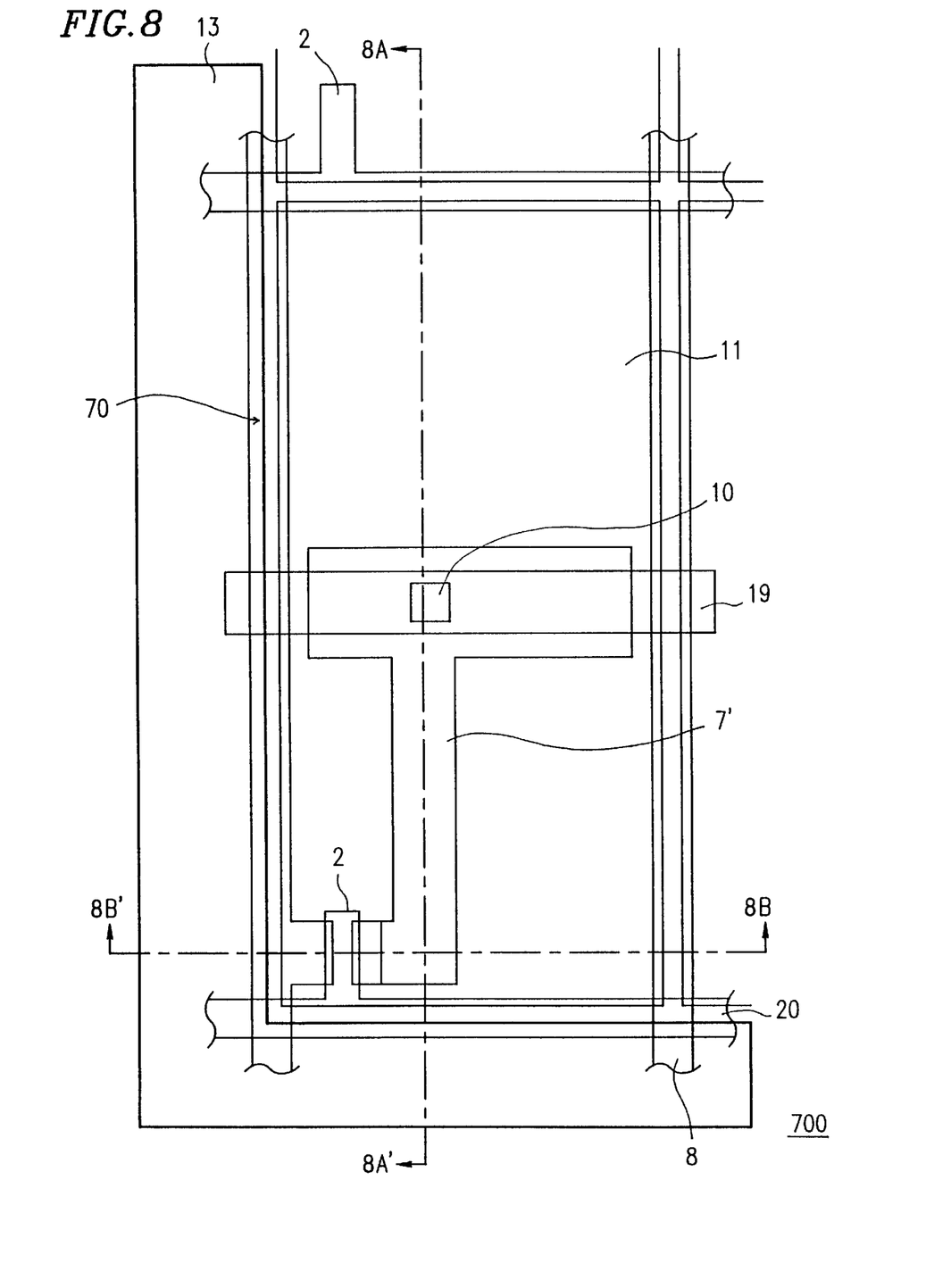
FIG. 8 is a partial plan view of an LCD device according to a third example of the present invention.

FIG. 8 is a partial plan view of the LCD device 700 according to the third example. FIG. 9A is a cross sectional view of the LCD device 700 along line 1A–1A' in FIG. 8, and FIG. 9B is a cross sectional view of the LCD device 700 along line 8B–8B' in FIG. 8.

Figure 9A:
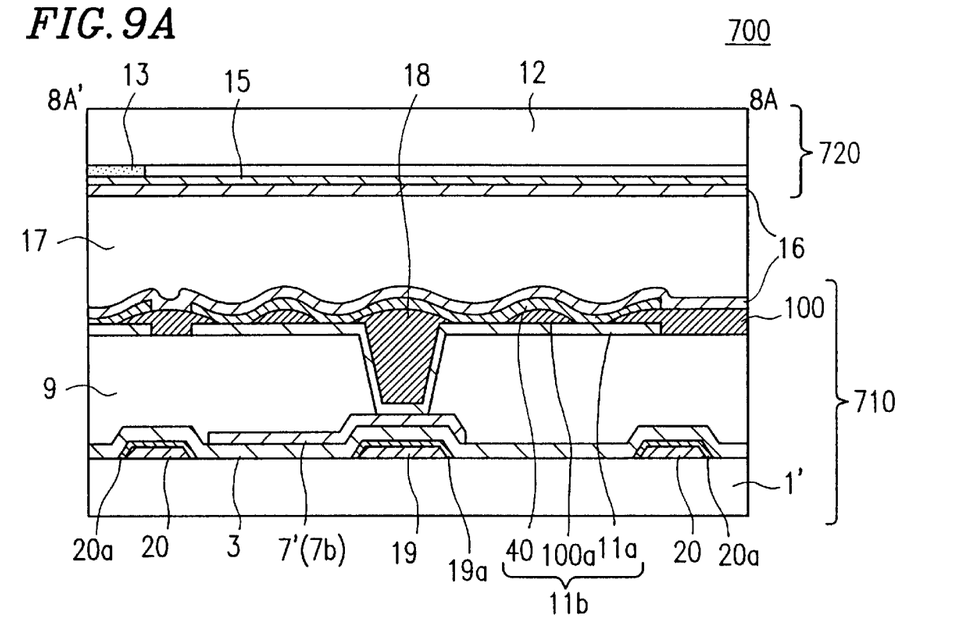
FIG. 9A is a cross sectional view of the LCD device shown in FIG. 8 along line 1A–1A'.
Figure 9B:
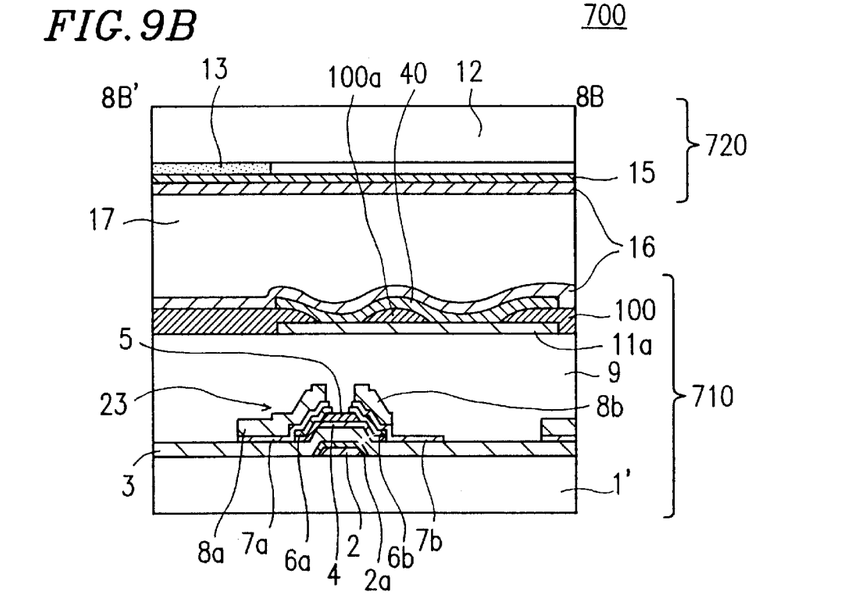
FIG. 9B is a cross sectional view of the LCD device shown in FIG. 8 along line 8B–8B'.

As shown in FIGS. 8, 9A and 9B, an active matrix substrate 710 of the LCD device 700 includes an insulation plate 1', a gate line 20, a gate electrode 2 connected to the gate line 20, and a picture element storage capacitor signal line 19. On the surfaces of the gate line 20, the gate electrode 2, and the picture element storage capacitor signal line 19, anodized films 20a, 2a and 19a are formed.

A semiconductor layer 4 is provided on the gate insulation layer 3 so as to overlap the gate electrode 2, and a channel protection layer 5 is provided on a central area of the semiconductor layer 4. A source electrode 6a and a drain electrode 6b both formed of $n^+$—Si are provided on the semiconductor layer 4 so as to be electrically connected to the channel protection layer 5. The source electrode 6a and the drain electrode 6b are separated from each other on the channel protection layer 5. The gate electrode 2, the source electrode 6a and the drain electrode 6b are included in a TFT 23.

A source line 70 including an ITO film 7a and a metal layer 8a provided on the ITO film 7a is provided on the gate insulation layer 3 so as to cover the source electrode 6a. The source line 70 is provided in a direction crossing the gate line 20.

A connecting electrode 7' formed of an ITO film 7b is provided on the drain electrode 6b, and a metal layer 8b is provided on the connecting electrode 7'. The connecting electrode 7' is extended on the gate insulation layer 3 for electrically connecting the drain electrode 6b and a picture element electrode 11a. As shown in FIGS. 8 and 9A, the connecting electrode 7' is extended to cover the picture element storage capacitor signal line 19. An area where the connecting electrode 7', the gate insulation layer 3 and the picture element storage capacitor signal line 19 overlap acts as a storage capacitor.

An interlayer insulation layer 9 is provided on the gate insulation layer 3 so as to cover the gate line 20, the source line 70 and the TFT 23. The picture element electrode 11a is provided on the interlayer insulation layer 9. The picture element electrode 11a is electrically connected to the drain electrode 6b via the connecting electrode 7' at the bottom of a contact hole 10 formed so as to run through the interlayer insulation layer 9.

As shown in FIG. 9A, the contact hole 10 is filled with a buried portion 18 formed of an insulation material. An insulation layer 100 is provided on the interlayer insulation layer 9. The insulation layer 100 includes a plurality of convex insulation areas 100a located on a surface of each picture element electrode 11a. A reflective layer 40 is provided on the picture element electrodes 11a so as to cover the convex insulation areas 100a. Thus, the reflective layer 40 is wave-like. The reflective layer 40 and the picture element electrode 11a are electrically connected to each other between the convex insulation areas 100a. The picture element electrode 11a, the convex insulation areas 100a and the reflective layer 40 are comprehensively referred to as a reflection-type picture element electrode 11b.

An alignment layer 16 is provided on the reflective layer 40.

A counter substrate 720 is located to face the active matrix substrate 710 with a liquid crystal layer 17 interposed therebetween. The counter substrate 720 includes a light-transmissive insulation plate 12, and a light-shielding layer 13 (black matrix) having an opening and a light shielding portion, a counter electrode 15 and another alignment layer 16 sequentially provided on the light-transmissive insulation plate 12.

The LCD device 700 having such a structure is preferably formed in the following manner. First, a production method of the active matrix substrate 710 will be described.

The gate electrode 2, the gate line 20, the picture element storage capacitor signal line 19, the gate insulation layer 3, the semiconductor layer 4, the channel protection layer 5, and an $n^+$—Si layer which will be formed into the source electrode 6a and the drain electrode 6b are sequentially formed on the insulation plate 1' in an appropriate manner. It is not necessary for the insulation plate 1' to be light-transmissive.

Next, the ITO films 7a and 7b, which are transpsrent and conductive, and the metal layers 8a and 8b are formed by sputtering and patterned to form the source line 70 and the connecting electrode 7'. In this example, the source line 70 includes two layers, i.e., the ITO film 7a and the metal layer 8a. The source line 70 may include only the metal layer 8a. The two-layer structure is advantageous in that, even if the metal layer 8a is partially defective, the electric connection is still conducted by the ITO layer 7a, which reduces the possibility of line disconnection.

Then, the interlayer insulation layer 9 is formed of a photosensitive acrylic resin to a thickness of 3 μm.

The interlayer insulation layer 9 is exposed and treated by alkaline development, thereby forming the contact hole 10 which runs through the interlayer insulation layer 9.

On the interlayer insulation layer 9, the picture element electrode 11a is formed by sputtering and patterning. The picture element electrode 11a is formed of ITO, which is transparent and conductive, but may be formed of other types of metal. The picture element electrode 11a is electrically connected to the connecting electrode 7' at the bottom of the contact hole 10. Thus, the picture element electrode 11a is connected to the source line 70 via the connecting electrode 7', the drain electrode 6b and the source electrode 6a.

Then, a photosensitive acrylic resin is formed to a thickness of 1500 nm by spin-coating. The resultant acrylic resin layer is exposed to light and treated by alkaline development, so as to leave the acrylic resin in a plurality of areas, thereby forming the insulation layer 100 including the plurality of convex insulation areas 100a in each of a plurality of picture element areas. During this process,. the contact hole 10 is filled with the acrylic resin. Thus, the buried portion 18 is formed. The buried portion 18 is preferably formed so that a convex insulation area 100a is located above the contact hole 10. A "picture element area" refers to an area where the picture element electrode 11a overlaps the counter electrode 15.

Then, the wave-like reflective layer 40 is formed on the convex insulation areas 100a so as to cover the areas between the convex insulation areas 100a by forming a metal layer formed of aluminum or the like having a sufficiently high surface reflectance and patterning the metal layer. The wave-like shape of the reflective layer 40 is advantageous in efficiently reflecting light incident from outside. The alignment layer 16 is formed on the reflectance layer 40. Thus, the active matrix substrate 710 is completed.

Next, a production method of the counter substrate 720 will be described.

A metal layer is formed on the light-transmissive insulation plate 12 by sputtering and patterning, thereby forming the light-shielding layer 13. The counter electrode 15 is formed on the light-shielding layer 13 of ITO by sputtering. Then, the alignment layer 16 is formed on the counter electrode 15.

The active matrix substrate 710 and the counter substrate 720 are assembled together, and a liquid crystal material is injected to the space between the two substrates, Thus, the liquid crystal layer 17 is formed. In this example, a guest-host liquid crystal material is used. Specifically, a guest-host liquid crystal material containing ZLI-4792 (Merck & Co., Ltd. ) as a liquid crystal material, an azo-type black dye added in several weight %, and S-811 (Merck & Co., Ltd.) as an optically active substance added in several weight % is used. The alignment layers 16 are rubbed so that the liquid crystal molecules are twisted 240 degrees. A polarizing plate is not necessary.

In the LCD device 700 according to the third example, the buried portion 18 formed of a photosensitive acrylic resin fills the contact hole 10, and the reflective layer 40 having a wave-like shape efficiently reflects the incident light. Due to these elements, the entirety of the picture element areas is effectively utilized, and thus the numerical aperture is improved.

The structure of the LCD device is not limited to the above-described structure. For example, an LCD device in which a guest-host material containing ZLI-4792 (Merck & Co., Ltd.) as a liquid crystal material and an azo-type black dye added in several weight %, a polarizing plate is provided on the side of the counter substrate from which the images are viewed, and the alignment layers are rubbed in the direction parallel to the polarization axis of the polarizing plate can be used.

According to the present invention, the contact hole is filled with a buried portion, and a top surface of the buried portion is at the seme level as that of the picture element electrode. Due to such a structure, the orientation of the liquid crystal molecules is not disturbed in an area corresponding to the contact hole. Thus, the light is not transmitted through an area where the light should not be transmitted, It is not necessary to mask the areas corresponding to the contact holes by using light-shielding materials for the metal electrodes, the gate lines, the source lines, the picture element storage capacitor signal lines, or by a black matrix of a color filter. Accordingly, a sufficiently high numarical aperture Is achieved. Moreover, since the picture element electrode can overlap the lines, the numerical aperture is further improved and defective orientation of the liquid crystal molecules is prevented.

In the case where the buried portion is formed by applying a photosensitive acrylic resin by spin-coating and treating the photosensitive acrylic resin by exposure to light and alkaline development for patterning, an organic thin film can be formed with sufficiently high productivity. By etching back the resultant organic thin film using anisotropic etching, the thin film can be left only in the contact hole in a highly controllable manner so that the top surface thereof is at the same level with the top surface of the picture element electrode. Accordingly, LCD devices having a satisfactory numerical aperture can be obtained with high productivity. When the resin used for the buried portion Is colored, the resin can be transparent by optical or chemical decoloring after being patterned. Such a step improves the color quality of the display.

The insulation layer including the buried portion can be used as an alignment layer by rubbing if an appropriate material is used. This simplifies the production method of the LCD device while maintaining a high numerical aperture.

When the contact hole is filled with a buried portion, convex areas can be formed on the picture element electrode in the same step. A reflection electrode formed thereon obtains convex and concaved areas, which results in efficient reflection of the incident light. Thus, the entire picture element area can be used efficiently, thereby improving the numerical aperture.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transparent active matrix substrate, comprising:

a switching device;

a scanning line electrically connected to the switching device;

a signal line electrically connected to the switching device and arranged so as to cross the scanning line;

a transparent interlayer insulation layer formed over the switching device, the scanning line and the signal line, the transparent interlayer insulation layer having a contact hole; and a transparent picture element electrode provided on the transparent interlayer insulation layer and electrically connected to the switching device through the contact hole, wherein the transparent picture element electrode has a recessed portion in the contact hole and a non-recessed portion over the interlayer insulation layer, and a buried portion formed of a transparent insulation material is provided in the recessed portion over the transparent picture element electrode so that a top surface of the buried portion and a top surface of the non-recessed portion of the transparent picture element electrode are at an identical level.

2. An active matrix substrate according to claim 1, further including an insulation layer provided on the picture element electrode, the insulation layer Including the buried portion.

3. An active matrix substrate according to claim 2, wherein the buried portion is formed of an organic thin film.

4. An active matrix substrate according to claim 3, wherein said buried portion is an optically discolored transparent buried portion.

5. An active matrix substrate according to claim 3, wherein said buried portion is a chemically discolored transparent buried portion.

6. An active matrix substrate according to claim 3, wherein the buried portion is formed of an anisotropically etched organic thin film applied to a plate having the picture element electrode thereon.

7. An active matrix substrate according to claim 2, wherein the buried portion is formed of a film which is obtained as a result of applying a photosensitive organic thin film on the picture element electrode so as to cover the recessed portion and performing exposure to light and alkaline development of the photosensitive organic thin film.

8. An active matrix substrate according to claim 1, wherein the buried portion is formed of an organic thin film.

9. An active matrix substrate according to claim 8, wherein said buried portion is an optically discolored transparent buried portion.

10. An active matrix substrate according to claim 8, wherein said buried portion is a chemically discolored transparent buried portion.

11. An active matrix substrate according to claim 8, wherein the buried portion is formed of an anisotropically etched organic thin filn applied to a plate having the picture element electrode thereon.

12. An active matrix substrate according to claim 1, wherein the buried portion is formed of a film which is obtained as a result of applying a photosensitive organic thin film on the picture element electrode so as to cover the recessed portion and performing exposure to light and alkaline development of the photosensitive organic thin film.

13. A liquid crystal display device, comprising:
an active matrix substrate according to claim 1;
a liquid crystal layer; and
a counter substrate located to face the active matrix substrate with the liquid crystal layer interposed therebetween, whereby light transmitted through the buried portion contributes to conducting a display.

14. An active matrix substrate, comprising:
a switching device;
a scanning line electrically connected to the switching device;
a signal line electrically connected to the switching device and arranged so as to cross the scanning line;
an interlayer insulation layer formed over the switching device, the scanning line and the signal line, the interlayer insulation layer having a contact hole; and
a picture element electrode provided on the interlayer insulation layer and electrically connected to the switching device through the contact hole, wherein the picture clement electrode has a recessed portion in the contact hole, and a buried portion formed of an insulation material is provided in the recessed portion so that a top surface of the buried portion and a top surface of the picture element electrode are at an identical level, wherein a plurality of convex areas are provided on the picture element electrode and a reflection electrode is formed over the plurality of convex areas, and wherein the plurality of convex areas are each formed of an insulation material, the picture element electrode is electrically connected to the reflection electrode between the plurality of convex areas, and a surface of the reflection electrode has convex areas and concave areas.

15. An active matrix substrate according to claim 14, wherein the plurality of convex areas and the buried portion are formed of an identical material.

16. An active matrix substrate, comprising:
a switching device;
a scanning line electrically connected to the switching device;
a signal line electrically connected to the switching device and arranged so as to cross the scanning line;
an interlayer insulation layer formed over the switching device, the scanning line and the signal line, the interlayer insulation layer having a contact hole; and
a picture element electrode provided on the interlayer insulation layer and electrically connected to the switching device through the contact hole,
wherein the picture element electrode has a recessed portion in the contact hole, and
a buried portion formed of an insulation material is provided in the recessed portion so that a top surface of the buried portion and a top surface of the picture element electrode are at an identical level, said buried portion having a convex portion.

17. An active matrix substrate, comprising:
a switching device;
a scanning line electrically connected to the switching device;
a signal line electrically connected to the switching device and arranged so as to cross the scanning line;
an interlayer insulation layer formed over the switching device, the scanning line and the signal line, the interlayer insulation layer having a contact hole;
a picture element electrode provided on the interlayer insulation layer and electrically connected to the switching device through the contact hole; and
an insulation layer provided on the picture element electrode;
wherein the picture element electrode has a recessed portion in the contact hole,
said insulation layer including a buried portion provided in the recessed portion so that a top surface of the buried portion and a top surface of the picture element electrode are at an identical level; and wherein said insulation layer including the buried portion covers the picture element electrode, and a surface of the insulation layer is subjected to rubbing treatment so as to act as an alignment layer.

18. A method for producing an active matrix substrate including:
a switching device;

a scanning line electrically connected to the switching device;

a signal line electrically connected to the switching device and arranged so as to cross the scanning line;

a transparent interlayer insulation layer formed over the switching device, the scanning line and the signal line;

a transparent picture element electrode provided on the transparent interlayer insulation layer; and a contact hole formed in the transparent interlayer insulation layer, wherein the transparent picture element electrode has a recessed portion in the contact hole and a non-recessed portion over the interlayer insulation layer, and the switching device is electrically connected to the transparent picture element electrode, the method comprising the step of:

filling the recessed portion with a transparent insulation material to form a buried portion in the recessed portion over the transparent picture element electrode so that a top surface of the buried portion and a top surface of the non-recessed portion of the transparent picture element electrode are at an identical level.

19. A method for producing an active matrix substrate including:

a switching device;

a scanning line electrically connected to the switching device;

a signal line electrically connected to the switching device and arranged so as to cross the scanning line;

an interlayer insulation layer formed over the switching device, the scanning line and the signal line;

a picture element electrode provided on the interlayer insulation layer; and a contact hole formed in the interlayer insulation layer, wherein the picture element electrode has a recessed portion in the contact hole, and the switching device is electrically connected to the picture element electrode, the method comprising the steps of:

forming a buried portion in the recessed portion of the picture element electrode, thereby filling the recessed portion, the buried portion being formed of an insulation material;

forming a plurality of convex areas on the picture element electrode; and forming a reflection electrode so as to cover the plurality of convex areas, thereby forming convex areas and concave areas at a surface of the reflection electrode.

20. A method according to claim 19, further comprising the step of applying a photosensitive resin to the picture element electrode and performing exposure to light and development of the photosensitive resin, thereby forming the buried portion and the plurality of convex areas simultaneously.

* * * * *